(12) United States Patent
McRae

(10) Patent No.: US 9,723,180 B2
(45) Date of Patent: Aug. 1, 2017

(54) DEVICE AND METHOD FOR CORRECTING LIP SYNC PROBLEMS ON DISPLAY DEVICES

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 65 days.

(21) Appl. No.: 14/150,142

(22) Filed: Jan. 8, 2014

(65) Prior Publication Data

US 2015/0195425 A1 Jul. 9, 2015

(51) Int. Cl.
| | |
|---|---|
| H04N 9/475 | (2006.01) |
| H04N 5/04 | (2006.01) |
| H04N 21/43 | (2011.01) |
| H04N 21/41 | (2011.01) |
| H04N 21/422 | (2011.01) |
| H04N 21/4223 | (2011.01) |
| H04N 17/04 | (2006.01) |
| H04N 17/00 | (2006.01) |

(52) U.S. Cl.
CPC .......... *H04N 5/04* (2013.01); *H04N 21/4126* (2013.01); *H04N 21/4223* (2013.01); *H04N 21/42203* (2013.01); *H04N 21/4302* (2013.01); *H04N 21/4307* (2013.01); *H04N 17/04* (2013.01); *H04N 2017/006* (2013.01)

(58) Field of Classification Search
CPC .......... H04N 21/4307; H04N 21/2768; H04N 21/4341; H04N 5/04; H04N 21/4126; H04N 21/42203; H04N 21/4223; H04N 21/4023; H04N 17/04; H04N 2017/006

USPC ......................................................... 348/515
See application file for complete search history.

(56) References Cited

U.S. PATENT DOCUMENTS

| | | | | |
|---|---|---|---|---|
| 6,630,953 B1* | 10/2003 | Toyoda et al. | ............. | 348/226.1 |
| 6,850,284 B2* | 2/2005 | Gries et al. | ................... | 348/512 |
| 6,862,044 B2* | 3/2005 | Kariatsumari | ............... | 348/515 |
| 7,020,894 B1 | 3/2006 | Godwin et al. | | |
| 7,636,126 B2* | 12/2009 | Mallinson | ..................... | 348/515 |
| 7,693,190 B2* | 4/2010 | Firestone et al. | ............. | 370/503 |
| 7,962,724 B1* | 6/2011 | Ali | ............... | 712/207 |
| 8,004,609 B2* | 8/2011 | Maegaki | ....................... | 348/515 |
| 8,400,566 B2* | 3/2013 | Terry et al. | ................... | 348/515 |
| 8,525,884 B2* | 9/2013 | Steinberg et al. | ............ | 348/181 |
| 8,665,370 B2* | 3/2014 | Lin | .............................. | 348/515 |
| 8,743,292 B2* | 6/2014 | Atherton et al. | ............ | 348/722 |
| 8,922,713 B1* | 12/2014 | Chakrovorthy et al. | ...... | 348/515 |
| 2006/0290810 A1* | 12/2006 | Mallinson | ..................... | 348/515 |
| 2009/0073316 A1 | 3/2009 | Ejima | | |
| 2012/0008045 A1* | 1/2012 | Yao | .............................. | 348/512 |
| 2012/0019633 A1 | 1/2012 | Holley | | |
| 2012/0081567 A1* | 4/2012 | Cote et al. | ................. | 348/222.1 |

(Continued)

FOREIGN PATENT DOCUMENTS

EP          2008442        12/2008

*Primary Examiner* — Michael Lee
(74) *Attorney, Agent, or Firm* — Law Office of Scott C Harris, Inc

(57) ABSTRACT

A system which synchronizes audio and video, that uses a sensor sensing the display of video and audio from an external device. The sensor creates timestamps for each of the video and audio, and then calculates a difference between those timestamps. The differences sent to the external device which then compensates for the difference.

14 Claims, 6 Drawing Sheets

(56) References Cited

U.S. PATENT DOCUMENTS

2012/0200774 A1* 8/2012 Ehlers, Sr. .................... 348/515
2015/0035994 A1* 2/2015 Son ........................ H04N 17/04
                                                            348/189

* cited by examiner

DEVICE AND METHOD FOR CORRECTING LIP SYNC PROBLEMS ON DISPLAY DEVICES

BACKGROUND

Maintaining synchronization between audio and video on a modern digital television is dependent on a number of variables. The sync can depend on, for example, the amount of computing performed for motion estimation and motion compensation (MEMC). Audio data and video data in a content stream are tied or synchronized together through timing codes contained in both the audio frames and associated video frames. Video processing however can introduce delays in the presentation of a video frame that synchronized with an audio frame. MEMC processing typically causes the audio frame to be played before the video frame is displayed. This synchronization error is referred to as "lip sync" delays.

The inventor has recognized the need to reduce or eliminate a timing error between when an audio frame is played and a video frame is displayed.

Modern digital televisions receive program content from various sources such as over the air (ATSC transmitted), program content received over IP (Internet Protocol), from local devices such as cable networks where set top boxes receive, decode and pass on digital content, satellite receivers that operate much the same as cable set top boxes, local multimedia player devices such as DVD players, game consoles where DVDs or other media is played and sent to televisions over wired and wireless communications links.

Because most program content is recorded/captured at a specified frame rate, generally 30 frames per second, there is a perceivable difference between watching the content on a movie screen where each frame is typically shown three times and watching the same content on a television.

Video content for television is typically recorded at 30 frames per second. This can result in what is known as juddering which expresses itself as a jerky motion of objects as they move across the screen. In order to present a fluid motion to objects on the screen, the video will be played back at 60, 120 or 240 frames per second depending on the television.

The technology for displaying more frames per second than contained in the original 30 frames per second can typically create additional frames between the original frames. The computations necessary to create the additional frames is referred to as Motion Estimation Motion Compensation or MEMC. MEMC allows additional frames to be created and to preserve fluid motion.

Audio recorded on movie film is typically recorded and preserved in one or more sound tracks immediately adjacent to the frame the audio is associated with. When movie content is digitized, the video and audio frames have synchronization values that tie a video frame to an audio frame.

Most digital televisions have what is referred to as "game mode" where gaming video content is displayed at its original frame rate. In this mode, the video being displayed is not processed to preserve fluid motion and may display juddering but the audio will always be in sync with the video.

When normal video is being displayed at, for example, 120 frames per second, there are four times as many frames being displayed (30 frames per second×4) as being received. Digital televisions displaying video at this rate will generally delay the audio by some fixed amount so that the audio and video do not get out of sync. Once the delay for creating the additional frames is known, computed or measured, a delay can be introduced into the audio stream processing such that the audio and video are in synchronization. This delay however is only valid for the audio processing inside the television.

Audio delay times may also be effected by home theater equipment where analog or digital sound may be sent from the television to the external equipment. In this case, the amount of processing performed by the external audio equipment is unknown and in many cases introduces a delay in the sound causing a video frame to be displayed before the associated audio is played.

Some television manufacturers will introduce a fixed "lip sync delay time" before audio frames are processed and played. Fixed delay times do not completely fix the synchronization problem between the processed video and the audio as discussed above relating to external sound equipment.

SUMMARY

The present invention provides a unique solution for addressing the synchronization drift between video presentation and audio playing of content on digital televisions and through external audio equipment.

BRIEF DESCRIPTION OF THE DRAWINGS in the drawings.

DETAILED DESCRIPTION

Figure 1:
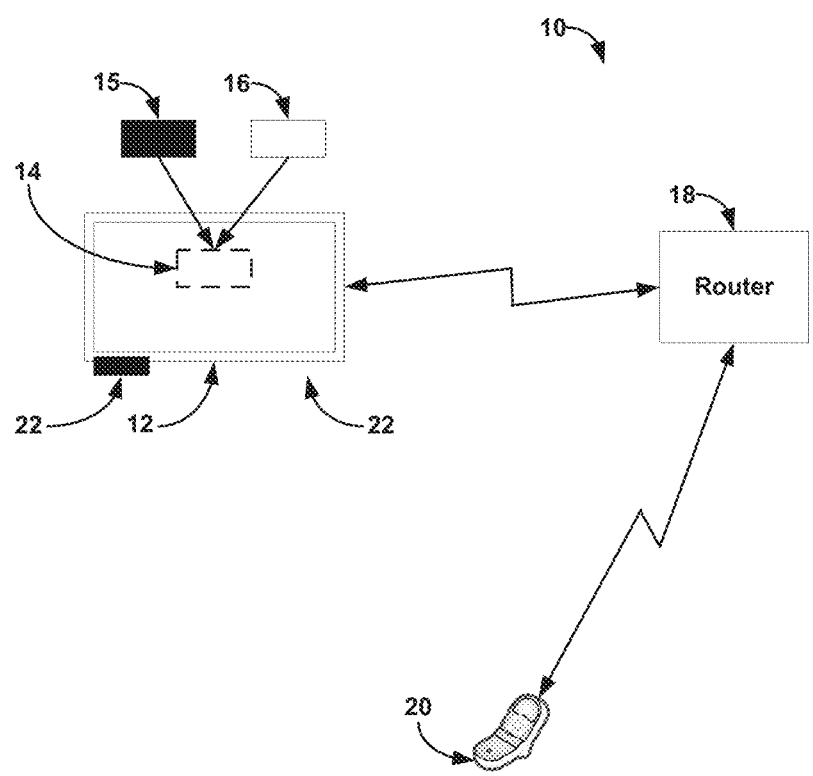
FIG. 1 is a schematic depiction of a digital television, an external sensor and a wireless router for establishment of a communications link between the external sensor and the digital television.

A system, method and apparatus allowing a user to correct audio video synchronization issues on display devices such as televisions is described. The described embodiments provide the user/viewer the ability to adjust the playing of content where the video and audio are out of sync.

One embodiment describes an application on a display device that displays an object on the screen and at the same time generates a recognizable sound which is played each time the object appears or changes. A sensor external to the television uses a microphone and camera and an application that executes on the external sensor and watches for appearance of the object or a change in the object displayed on the television and detection of the sound emitted when the object changes. If the sound and the object appearance or change in the object is determined by the application to be out of sync, the application computes a time correction and sends the correction to the display device which corrects the synchronization issue between the sound and the display.

In a preferred embodiment, a sensor is external to the digital television. The external sensor may be a hand held PDA, cell phone or purposed sensor. The external sensor has the capability to "watch and listen" to a digital television through the use of an embedded camera and a microphone which may or may not be embedded in the sensor. The sensor may also have the capability of recording video and audio.

In this embodiment, a first software application executes on the external sensor and a second software application executes on the digital television. The external sensor is in communications with the second software application on the digital television through a wired or wireless interface between the television and the external sensor.

The first software application will notify the second software application to "play" a prerecorded audio/video (A/V) track on the digital television where the track will display a predetermined video clip where a recognizable object that changes shape or color is displayed along with a sound track that contains a recognizable sound played every time the displayed object changes shape or color. The external sensor time stamps the time that the displayed object on the display screen is seen to change shape or color and the related time when the sound denoting the change of the displayed object is recognized.

The differences in time, if any, when the displayed object changes and the time of reception of the sound will be saved and a difference is computed. The difference value is sent over the communications link from the external sensor to the digital television where the second software application alters the delay between presentation of a video frame and the playing of the associated sound.

This embodiment can differentiate between the sound arriving early and the changing of the object on the screen arriving early. When the sound denoting a change in the object arrives before the object on the screen changes, the delay value is computed to delay playing of the sound. If the video for the changing object on the screen is detected before the sound denoting the change of the object, the delay is computed to advance the playing of the sound denoting the change of the object on the screen.

In another embodiment, the video track being played on the digital television has multiple objects that move substantial distances between frames to maximize the amount of processing needed to maintain fluid motion across the created frames being displayed.

The introduction of rapid motion may introduce delays in the played video frames that may be different from a video clip where there is minimal or no movement between displayed frames. In this embodiment, the first software application accumulates multiple time difference samples and averages the computed delay across the samples before sending the delay data over the communications link from the external sensor to the digital television where the second software application will alter the delay between presentation of a video frame and the playing of the associated sound.

In another related embodiment, the external sensor may, if there is a difference in time between the objects on the screen changing and the detection of the audio sound related to the change in the object, "walk" the video and audio into synchronization.

In this embodiment, the external sensor watches the objects on the screen as they change color or shape and monitors the arrival of the sound relative to the objects being displayed. If the video is being displayed before the audio is detected, the first software application computes a delay value to cause the audio to be played sooner in relation to the video being displayed. After the new value is applied to the audio delay, successive iterations of monitoring and computing of delay values are performed until the audio and video are in synchronization.

If the audio is detected before the video object is detected by the first software application in the external sensor, a delay value to hold the audio off for some period of time is computed by the first software application and sent to the second software application in the television. After the new value is applied to the audio delay successive irritations of monitoring and computing of delay values are performed until the audio and video are in synchronization.

In another embodiment, the audio denoting a change in the object on the screen may be sent from the television to an external audio system. In this embodiment, the audio may undergo additional processing by the external system which introduces an additional delay to the audio. In this embodiment, the external sensor detects the additional delay introduced by the external audio system, computes a new delay value and sends the delay value over the communications link from the external sensor to the digital television where the second software application will alter the delay between presentation of a video frame and the playing of the associated sound.

In another embodiment, the external sensor monitors normal content being played on the television. The external sensor will attempt to recognize video images of objects and events that may cause a recognizable sound to be played such as gun shots (a gun image followed by the sound of a gunshot) or explosions (a flash of light, billowing clouds of debris and a sudden sound of the explosion).

In this embodiment, several seconds of video and audio may be recorded by the sensor, then processed for the video and audio clues. Once a recognizable video event is detected, the time between the start of the recognizable audio associated with the video event will be determined and a delay value computed and sent to the second software application which will apply the computed delay value to alter the delay between presentation of a video frame and the playing of the associated sound.

In another embodiment, the first software application becomes aware of where the audio is being processed. If the television has more than one source of video and audio input and more than one audio playback channel (one or more external audio systems), the second software application becomes aware of which audio system is actually in use and changes the audio delay/advance times such that the audio and video will always be in sync.

In another embodiment, the digital television will not have the second software application present. In this embodiment, the video track is sourced from an external player such as a DVD player connected to the television through a HDMI cable or has the video track sourced over a wired or wireless LAN.

In this embodiment, the external sensor will function as normal with the exception that it displays the time differences on a display screen integral to the sensor. Once a time difference is displayed, the user can introduce the time delay to the digital television through a diagnostic port or only make not of the amount of time the audio and video are out of synchronization.

Now referencing FIG. 1 where 10 depicts the functional components of the hardware of the embodiments. In FIG. 1, 12 depicts a digital television with speakers 22. Display screen area 14 may display one of two recognizable objects 15 or 16 at various times. These objects are designed such that external sensor 20 which has an embedded camera and microphone can easily recognize the display objects 15 and 16 and sound associated with the displayed objects emitted by speakers 22.

Figure 4:
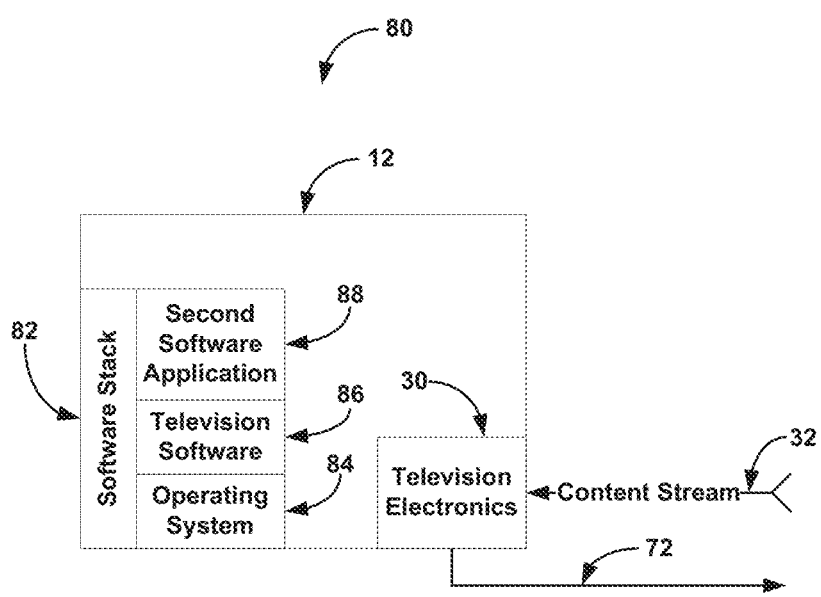
FIG. 4 is a schematic depiction of the software stack resident in the digital television.
Figure 5:
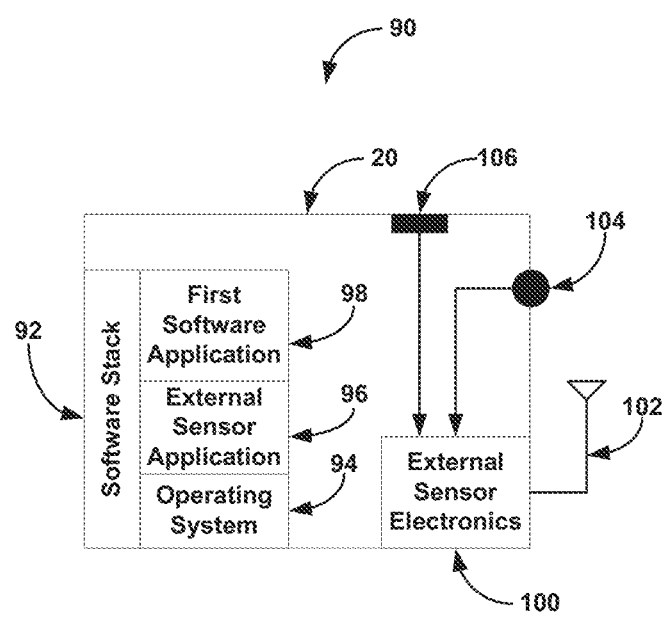
FIG. 5 is a schematic depiction of the software stack resident in the external sensor.

In FIG. 1, external sensor 20 runs a first software application 98 (as shown in FIG. 5). Digital television 12 runs a second software application 88 (as shown in FIG. 4). First software application 98, residing on external sensor 20, will communicate with the second software application 88 residing on digital television 12 through wireless router 18.

The communications link between external sensor 20 and digital television 12 may be wired or wireless. Wireless communications links may use 802.11x (Wifi) protocol or Bluetooth or a proprietary protocol or may communicate via cellular or infra red.

The communications link between external sensor 20 and digital television 12 may also be between external sensor 20 and digital television 12 without passing through router 18. The protocol used in this case may be Wifi Direct™ or Bluetooth™ or some other open or proprietary protocol.

Figure 6:
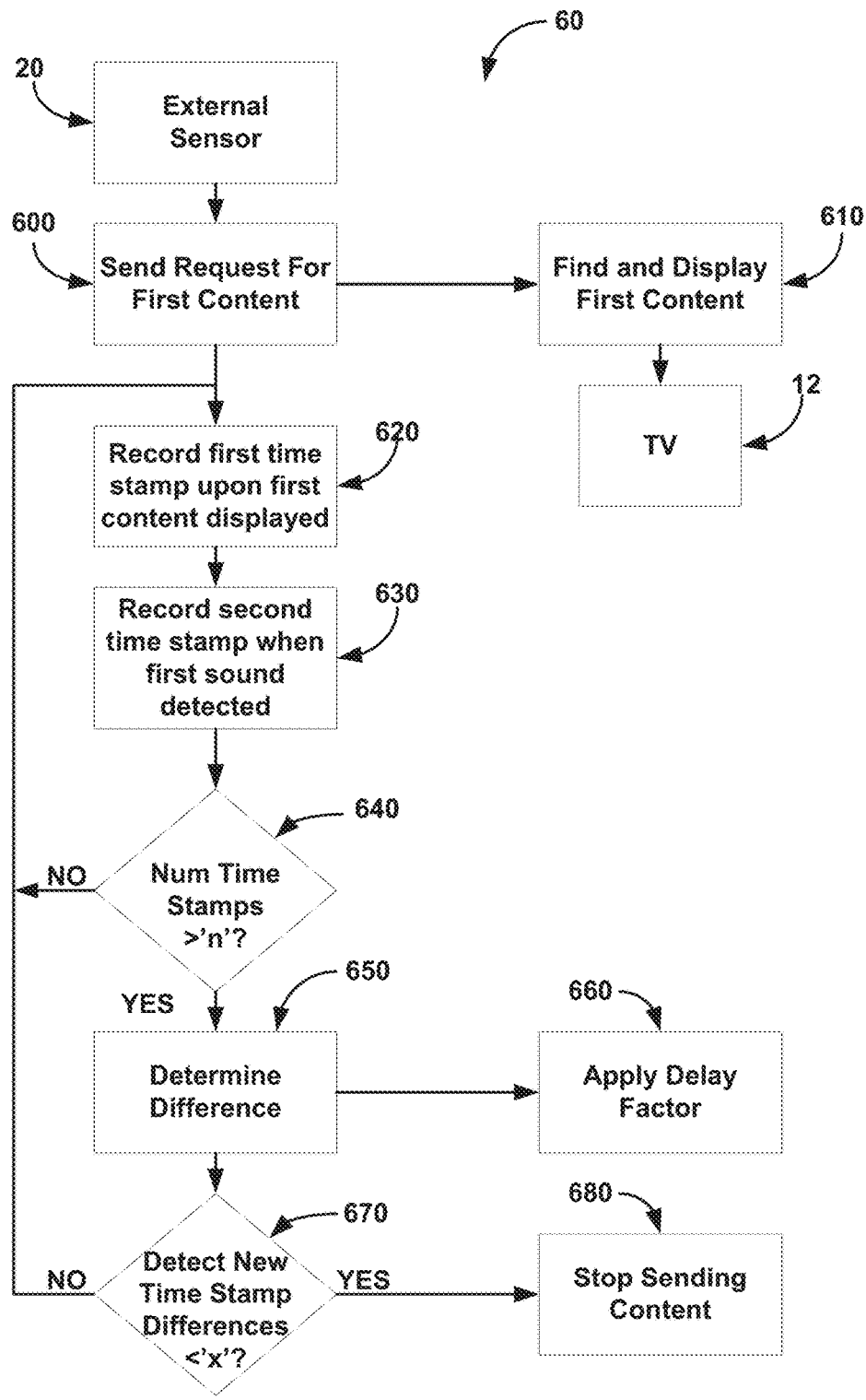
FIG. 6 is a flowchart of operation and the communication between the television and the sensors.

FIG. 6 illustrates a flowchart of operation of communication between the different software applications. First software application 98 executing on external sensor 20 sends a request at 600 to second software application 88 executing on digital television 12 to display a video clip having specified first content. The specified first content in this embodiment can include rectangles 15 and 16 which are contrasting colors and are displayed at some predetermined rate in area 14. A sound of a first specified type is also emitted as each rectangle is displayed. While rectangles 15 and 16 are alternately being displayed, their associated sounds being emitted may be the same sound or a unique sound for each of the rectangles. At 610, the digital television 12 finds and displays the first content which can be of a specified type in different embodiments.

After sending the request at 600, First software application 98 monitors for the reception of the first content, and records a first time stamp at 620 each time the first content is displayed. In this embodiment, the first content is images of rectangles, and the timestamp is recorded when the sensor 100 detects the image of those rectangles 15 and 16. At 630, Application 98 also records a second time stamp for when each of the sounds associated with the image of rectangles is detected. These timestamps are all saved. At 640, the application determines whether a predetermined number 'n' of time stamps have been saved. If the number of timestamps is greater than 'n', then control passes back to record additional timestamps. However, if more than 'n' timestamps have been received, then application 98 determines the difference between detection of rectangles 15 and 16 and their associated sounds at 650. These differences may be averaged together or the largest difference will be sent to second software application 88 in digital television 12 via wireless router 18. Note that more accurate detection will be obtained by monitoring for more timestamps; however a single timestamp can also be used as the number, and the difference at 650 can be detected after a single timestamp.

The difference obtained at 650 is then sent to second software application 88 residing in digital television 12 then operates, after receiving the difference value from first software application 98, to apply the difference value to a delay factor at 660 such that the sound associated with the display of rectangles 15 and 16 occur simultaneously.

At 670, the external sensor 100 again detects timestamp differences. When the external sensor 100 detects that the difference between display of rectangles 15 and 16 and their associated sound is within an acceptable time period x, the first software application residing in external sensor 20 notifies second software application 88 residing in digital television 12 that the delay is acceptable after which the applications will stop execution at 680. If the timestamp indicates that the difference is still too large, control passes back to detect new timestamps, and to attempt to compensate for that difference.

These applications can be, for example, automatically run every specified period of time, or can be part of an initial set up, or run whenever the user indicates the television that the sound is out of sync.

Figure 2:
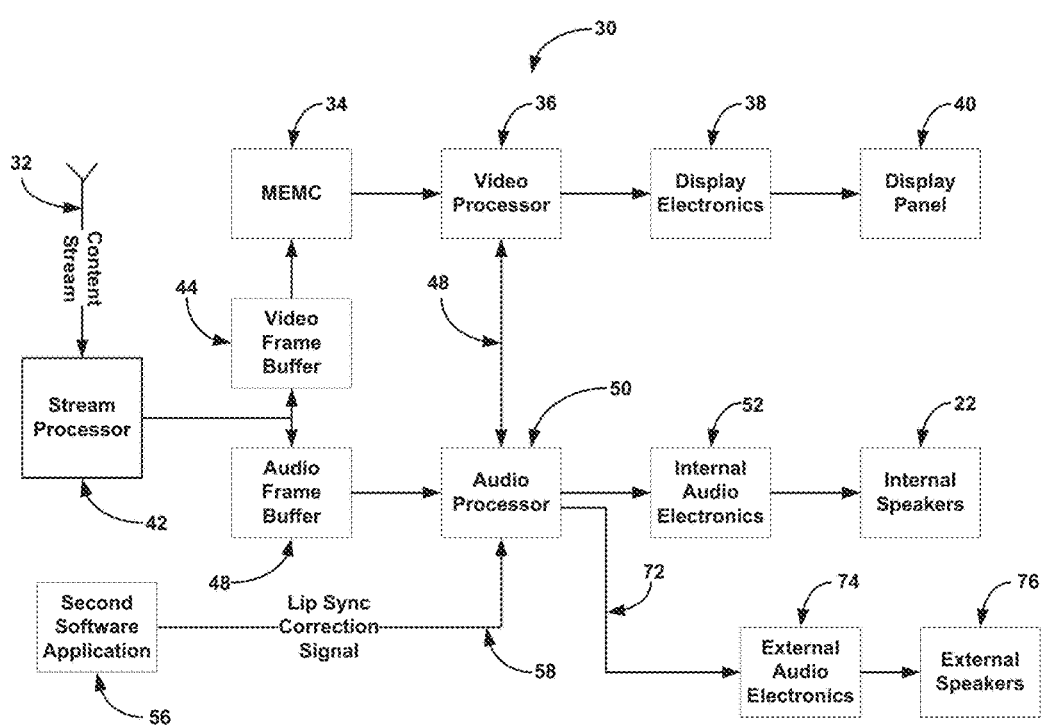
FIG. 2 is a schematic depiction of the processing components in a digital television that manage a digital program content stream and components processing the motion estimation and compensation and playback of the audio frames of the content stream.

Now referencing FIG. 2 where 30 depicts the functional components inside a digital television that process the video and audio from content streams. Note that variations in these functional components may be present in different digital televisions.

In FIG. 2, video content is received through content stream 32. This stream may arrive into the television via an HDMI cable connected to a set top box or from a multimedia player such as a DVD player or a game console, via a Wifi connection or a wired LAN connection, a cable carrying digital information from a cable provider, a set top box receiving digital content through a cable and cable provider, a set top box receiving digital content from a satellite receiver or some other digital equipment that can provide digital content.

Stream processor 42 will processes the digital stream and separate video frames from audio frames and from other digital data such as metadata. Stream processor 42 places video frames into video frame buffer 44 and audio frames into audio frame buffer 48.

MEMC (motion estimation motion compensation) moves complete frames from video frame buffer through to video processor 36 and constructs additional video frames that are passed onto video processor 36. Video processor 36 places frames it receives from MEMC into display electronics 38 which controls the timing and movement of data from the frames into display panel 40.

Audio processor 50 moves audio frames from audio frame buffer and holds the frame before passing it onto internal audio electronics 52 or to external audio electronics 74 via audio interface 72. Audio interface 72 may be an analog audio bus or a digital audio bus.

Audio processor 50 synchronizes the release of audio frames to audio electronics (52 and/or 74) through synchronization signals 48. When internal audio electronics 52 receives audio frames it converts the digital audio data to analog and sends the analog signals to internal speakers 22. When external audio electronics 74 receives audio frames via audio interface 72, it converts the digital audio data to analog and sends the analog signals to external speakers 76. If external audio electronics 74 receives audio frames that are encoded (Dolby, Dolby Digital, SRS or some other digital enhancing codec) it will decode the audio, convert it to analog and send the analog signals to external speakers 76.

Opportunities for the video frames and analog frames to drift out of synchronization occur when MEMC is constructing the additional frames between complete frames and when external audio electronics 74 is decoding encoded digital audio frames.

Figure 3:
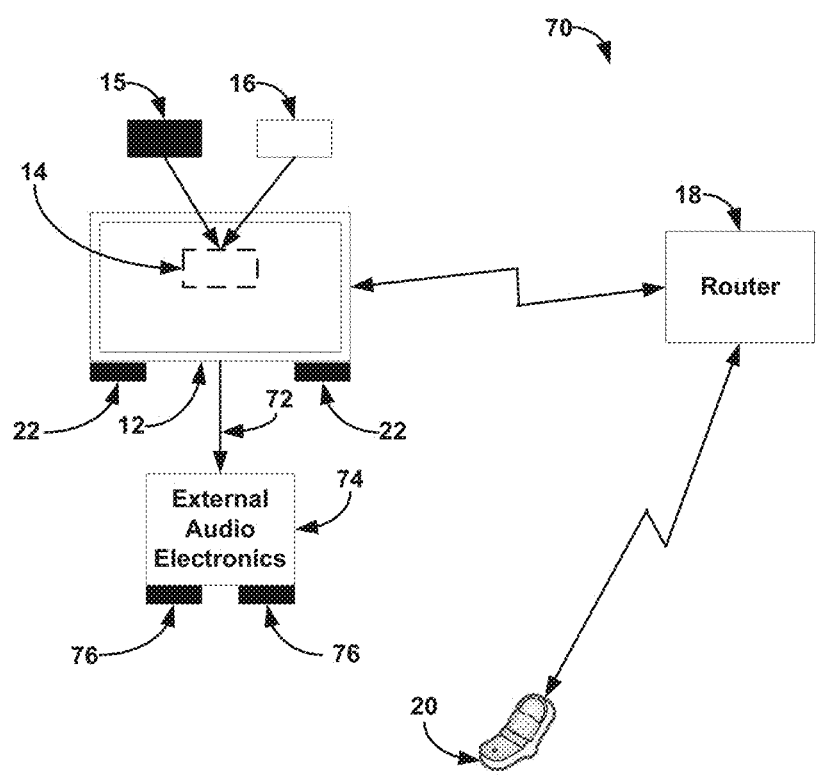
FIG. 3 is a schematic depiction of a digital television and an external audio system where audio from the television is played.

Now referencing FIG. 3 where 70 depicts the functional components of the invention where audio is processed by an external audio system 74. In this depiction, sound is emitted by external speakers 76 and detected by external sensor 20.

First software application 98 executing on external sensor 20 will send a request to the second software application 88 executing on digital television 20 to display a video clip where the content to be displayed will consist of rectangles 15 and 16 which are contrasting colors and will be displayed at some predetermined rate in area 14 with a sound being emitted as each rectangle is displayed. While rectangles 15 and 16 are alternately being displayed, their associated sounds being emitted by external audio electronics 74 and external speakers 76 may be the same sound or a unique sound for each of the rectangles.

Now referencing FIG. 4 where 80 depicts digital television 12, its electronics 30 (depicted in FIG. 2), content stream input 32, audio interface 72 (digital audio output) and software stack 82.

Software stack 82 uses an operating system 84 which controls execution of other software in software stack 82. Operating system 82 manages typical operating system functions such as files systems and execution order. Television software 86 manages the functionality of the television electronics such as video processing, setup of hardware values and user interfaces. Second software application 88 plays video tracks designed to display known objects 15 and 16 in display area 14 on display panel 14, receive audio video synchronization differences from external sensor 20 and apply synchronization values such as delay data to audio processor 50.

Now referencing FIG. 5 where 90 depicts external sensor 20. In this depiction, electronics 100 provides the base electronics for external sensor 20. Electronics 100 receives images from camera 104 and audio from microphone 106 and communicates with other devices, such as router 18 or digital television 12.

Note that in one embodiment, the external sensor 20 can be a cellular phone or PDA of the user that runs an app that can be downloaded or provided by the television manufacturer. In another embodiment, the external sensor can be a remote control associated with the television.

Software stack 92 uses an operating system 94 which controls execution of other software in software stack 92. Operating system 92 manages typical operating system functions such as files systems and execution order. External sensor application 96 manages the base functionality of the external sensor 20. External sensor 20 may be a cell phone, PDA or other such device.

First software application 98 controls the capture of video and audio data monitored by external sensor 20 through camera 104 and microphone 106. First software application 98 computes the differences in arrival time of images and their associated sounds. First software application 98 computers the differences in time and sends the differences to second software application 88 residing in digital television 12.

The description of FIG. 6 above refers to determining timestamps between when first content is displayed and when first sounds are detected. There are a number of embodiments, described above, of ways that this can be carried out. In one embodiment described above, there can be multiple objects that are detected by the external sensor 20, with specified sounds associated with each of those objects. The amount of movement of those objects can be changed, so that the movement between frames can be compensated.

However, the other embodiments described above are also included within the flowchart of FIG. 6. For example, the finding of the first content can be finding of objects other than the rectangles such as content being played during the normal operation of the television.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of shapes and sounds, and with different kinds of external sensors.

Note also that the above has described operation with a digital television. However, more generally, this can be used on any kind of device that displays videos, such as television sets, Set top boxes, Game consoles, Tuner dongles, Personal computers, and any other device having the ability to display AV content.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system which synchronizes audio and video, comprising:
   a sensing device, having an image sensing device sensing a display of a recognizable object in video that is playing on an external display by sensing images on the external display, where the sensing device senses the recognizable object as changing shape or color,
   said sensing device also having a sound sensing device sensing a sound associated with the recognizable object as corresponding sounds that are associated with said recognizable object,
   said sensing device having a processing device, and creating first information about a time that said recognizable object is detected to change shape or color, and creating second information about times that said corresponding sounds are detected,
   wherein said sensing device senses information from multiple different objects in the video that is playing, and wherein the sensing device senses which of multiple audio systems are being used, where all of said multiple audio systems are used with the same external display, and sends information to sync audio and video to the external display, where said information is specific to a specific one of said multiple audio systems that are being used and is different for a first audio system being used with said external display, than for a second audio system being used with said external display, and said processing device computing a difference value between times of the first information and times of the second information, and sending said difference value to a remote player of said audio and video.

2. The system as in claim 1, wherein said sensing device automatically sends the difference value that causes the audio to be played sooner in relation to the video being displayed, but less than a total difference, in order to require successive iterations of difference values until the video and audio are in synchronization, and continues to sense the display of said recognizable object until the video and audio are in synchronization.

3. The system as in claim 1, wherein the difference is, at a first time, a negative difference where the audio is playing before the video, and at a second time a positive difference where the video is playing before the audio.

4. The system as in claim 1, wherein said sensing device stores multiple time difference samples accumulated at multiple different times, and the processing device in said sensing device averages a computed delay across the multiple time difference samples before sending data indicating the delay over a communications link from the sensing device to the remote player.

5. The system as in claim 1, wherein an output is a wireless stream that is communicated with an external video producing device that produces video that is sensed by said video sensing device, wherein said sensing device includes a camera.

6. The system as in claim 1, wherein said sensing device is a cellular phone, said sensing device including a camera on the cellular phone, and also including a microphone on the cellular phone.

7. The system as in claim 1, wherein said sensing device is a PDA that runs downloaded applications, said sensing device including a camera and a PDA and also including a microphone on the PDA.

8. A video producing system, comprising:
a video output screen, producing video, and producing sounds associated with the video,
a communication device,
a processing device, that receives a communication from an external device that represents a computed difference value, between a time of that a recognizable object is detected to change shape or color, where said recognizable object is playing in a video that is being played to a user, and a time of a sound associated with the recognizable object in the video, and responsive to said communication automatically adjusting a time between the producing of the video and the producing of the sounds, to adjust the time between audio and video in a first way when the audio plays before the video, and to adjust the audio and video in a second way when the video plays before the audio, wherein the video output screen produces its sounds via one of multiple different audio systems, all of said multiple different audio systems being used with the same video output screen, said communication represents a time difference for a specific audio system which is different for a first audio system being used with said video output screen, than it is for a second audio system being used with said video output screen.

9. The system as in claim 8, wherein said processing device runs an application that communicates with an external sensor that senses the video and the audio.

10. The system as in claim 9, wherein said processing device receives a command from the sensor to produce specified audio and video, and responsively receives said communication responsive to producing said specified audio and video.

11. A system which synchronizes audio and video, comprising:
a sensing device, sensing a display of first video information on a remote player, and said sensing device also sensing a corresponding sound from the remote player that is associated with said first video information,
said sensing device calculating a first time difference between said display and said corresponding sound at a first time;
said sensing device storing multiple other time difference samples accumulated at multiple different times, than said first time,
and the sensing device computing an average of a computed delay across the multiple other time difference samples and the first time difference, and sending averaged delay information indicative of the average of the multiple time difference samples to the remote player;
where the averaged delay information is sent to the remote player of said audio and video,
wherein the sensing device senses which of multiple audio systems are being used, where all of said multiple audio systems are used with a same external display, and sends information to sync audio and video to the external display, where said information is specific to a specific one of said multiple audio systems that are being used and is different for a first audio system being used with said external display, than for a second audio system being used with said external display.

12. The system as in claim 11, wherein said sensing device senses information from multiple different objects in the video that is playing.

13. The system as in claim 11, wherein the sensing device not sending an individual computed delay before computing an average of a computed delay across the multiple other time difference samples and the first time difference.

14. A system which synchronizes audio and video, comprising:
a sensing device, having an image sensing device sensing a display of a recognizable object in video that is playing on an external display by sensing images on the external display;
said sensing device also having a sound sensing device, senses which of multiple different audio systems are being used with the same external display,
and sensing a sound associated with the recognizable object as corresponding sounds that are associated with said recognizable object,
said sensing device having a processing device, and creating first information about a time that said recognizable object is detected, and creating second information about times that said corresponding sounds are detected, and said processing device computing a difference value between times of the first information and times of the second information, and sending said difference value to a remote player of said audio and video and sends information to sync audio and video to the external display, and where said information is specific to a specific one of said multiple audio systems that are being used with the external display, wherein the sensing device senses which of multiple audio systems are being used, and sends information to sync audio and video to the external display, where said information is specific to a specific one of said multiple audio systems that are being used and is different for a first audio system being used with said external display, than for a second audio system being used with said external display.

* * * * *